United States Patent [19]

Roesler

[11] Patent Number: 4,609,326

[45] Date of Patent: Sep. 2, 1986

[54] GRIPPING ARRANGEMENT

[75] Inventor: Hermann Roesler, Oberstenfeld, Fed. Rep. of Germany

[73] Assignee: Deutsche Industrieanlagen Gesellschaft mit beschraenkter Haftung Berlin, Berlin, Fed. Rep. of Germany

[21] Appl. No.: 678,012

[22] Filed: Nov. 30, 1984

[30] Foreign Application Priority Data

Dec. 3, 1983 [DE] Fed. Rep. of Germany ....... 3343765

[51] Int. Cl.$^4$ .................... B23Q 3/157; B65G 47/90
[52] U.S. Cl. .................................... 414/736; 29/568; 294/86.4; 294/88; 294/119.1; 901/39
[58] Field of Search .................... 294/86.4, 86.41, 87.1, 294/88, 90, 103.1, 115, 116, 119.1, 113, 902; 29/568; 414/736; 901/30-32, 36-39

[56] References Cited

U.S. PATENT DOCUMENTS

| 1,729,330 | 9/1929 | Dart | 294/119.1 |
| 2,298,145 | 10/1942 | Merrylees | 294/119.1 |
| 3,451,711 | 6/1969 | Carpenter | 294/113 |
| 3,472,401 | 10/1969 | Scaperotto | 294/119.1 X |
| 3,803,704 | 4/1974 | Seidel | 29/568 |
| 3,964,616 | 6/1976 | Piotrowski | 29/568 X |
| 4,050,146 | 9/1977 | Geiger | 29/568 |
| 4,072,236 | 2/1978 | Nomura et al. | 294/88 X |
| 4,397,605 | 8/1983 | Cowgill et al. | 294/88 X |

FOREIGN PATENT DOCUMENTS 1402985 11/1976 Fed. Rep. of Germany .
2820315 11/1980 Fed. Rep. of Germany .

Primary Examiner—Johnny D. Cherry
Attorney, Agent, or Firm—Michael J. Striker

[57] ABSTRACT

A gripping arrangement, particularly for manipulators, tool exchange devices and the like, has a housing, a guide provided in the housing, and two gripping fingers having gripping ends and moveable along the guide of the housing in a translatory reciprocating movement between a gripping position in which the gripping ends receive and hold an object therebetween and the gripping ends extend outwardly beyond the housing, and a releasing position in which the gripping ends release the object and gripping fingers are withdrawn substantially completely into and without projecting beyond the housing, the guide includes arcuate guiding tracks and guiding elements guided in and along the latter so that the movement of the gripping fingers includes a rectilinear component extending in a direction toward the object to be gripped and a transverse component extending transverse to the first component and in a direction toward the object to be gripped, whereby each of the gripping fingers during its movement from the releasing position toward the gripping position performs a rectilinear movement in a direction toward the object on which the transverse component directed toward the object is superposed, the gripping fingers have an axis therebetween and the arcuate guiding tracks are arranged symmetrically relative to the axis, and the gripping ends of the gripping fingers have inner sides and are provided at the inner sides with gripping surfaces which face toward the object in the gripping position and each has a portion embracing the object before its diametrical plane and a portion embracing the object after its diametrical plane.

29 Claims, 9 Drawing Figures

GRIPPING ARRANGEMENT

BACKGROUND OF THE INVENTION

The present invention relates to a gripping arrangement. More particularly, it relates to a arrangement for manipulators, particularly industrial robots, but also can be used in other technical fields and for example also in tool exchanges devices of numerically controlled working units, especially horizontal working centers.

Gripping arrangements of the above-mentioned general type for tool exchange devices are known, in which gripping fingers are arranged at both ends in a housing. They are formed so that in the gripping position outwardly of the housing to grip an object, for example a tool, the object is received and held in their mouth-like open gripping ends. The gripping fingers are held and guided in the housing so that their gripping ends project outwardly beyond the housing only in the gripping position, whereas in their inoperative position for releasing the object they are retracted at least substantially completely and without projecting outwardly, inside the housing. Both gripping fingers are translatorily reciprocable along guiding paths in the housing. They are extended or retracted with the aid of a toothed rod guided in the housing by a rotary drive of a pin engaging with the toothed rod. Both gripping fingers are coupled hingedly and spring-loaded. One of the gripping fingers can turn at the end of the housing opening to the mouth-like open position. The guiding paths along which the gripping fingers reciprocate are rectilinear, and always only one gripping finger is translatorily reciprocable and forms a fixed part of a rectilinear rod provided with the toothed rod and linearly displaceable by the pinion. The other gripping finger is turnably moveable on the first-mentioned gripping finger and displaceable together with the latter during its linear displacement.

In another construction, namely for a sorting star for bottle sorting installations, arcuate fingers with arc-shaped closing movement and formed as so-called blocking fingers are known. They form additional components of a bottle receptacle and operate so that by the arcuate extension the bottle received inside the bottle receptacle is secured at its rear end from falling out in the manner that the extended arcuate finger closes the bottle receptacle at the rear end of the bottle supported therein.

The known arrangements of the above-described type have the disadvantage that the gripping fingers during turning movement from the releasing position to the gripping position and vice versa pass through a great radial region neighboring to the rotary object to be engaged. For a disturbance-free movement course a sufficient free place for the object to be gripped must be available in this radial neighboring region. When this is not provided, there will be a danger of collision. At the same time the known gripping arrangements require great neighboring free space. They cannot be used in conditions of narrow working places and when such free spaces are not available. Moreover, the movement course requires running over a relatively great path. Thereby a very high idle time takes place. The gripping process and in some cases a subsequent exchange process are thereby relatively long, and in any case is not as fast as desirable. Moreover, the known gripping arrangements are voluminous, heavy, complicated in construction and function and also expensive. Especially in the situations when a relatively larger and heavy object is to be gripped, the known gripping arrangements must be designed very strong and bending-resistant. Since further it must be guaranteed that in the gripping position both gripping fingers of the engaged object are held reliable, considerable holding forces must be provided in the gripping position to prevent falling out. Especially when in the gripping position the gripping arrangement moves with high speed from one position to the other, for example in tool exchange devices for numerically controlled power tools, when high centrifugal forces act on the gripped objects, the holding forces must be especially high. This requires a provision of powerful, voluminous and heavy as well as expensive driving devices for the gripping fingers.

SUMMARY OF THE INVENTION

Accordingly, it is an object of the present invention to provide a gripping arrangement which avoids the disadvantages of the prior art.

More particularly, it is an object of the present invention to provide a gripping arrangement which is formed so that it is small, has a small weight, is simple and not complicated in construction and operation and thereby is price economical, and also does not require expensive and heavy adjusting drive for operation of gripping fingers, particularly for securing the gripping position, and finally for movement from a releasing position to the gripping position and vice versa a small free space around an object to be gripped is needed and therefore a short path must be covered so that exchange movement between the releasing position and the gripping position causes only short idle time.

In keeping with these objects and with others which will become apparent hereinafter, one feature of the present invention resides, briefly stated, in a gripping arrangement, particularly for manipulators, tool exchange devices and the like, which comprises a housing, guiding means provided in the housing, and two gripping fingers having gripping ends and moveable along the guiding means of the housing in a translatory reciprocating movement between a gripping position in which the gripping ends receive and hold an object therebetween and the gripping ends extend outwardly beyond the housing, and a releasing position in which the gripping ends release the object and gripping fingers are withdrawn substantially completely into and without projecting beyond the housing, wherein the guiding means includes arcuate guiding tracks and guiding elements guided in and along the latter so that the movement of the gripping fingers includes a rectilinear component extending in a direction toward the object to be gripped and a transverse component extending transverse to the first component and in a direction toward the object to be gripped, whereby each of the gripping fingers during its movement from the releasing position toward the gripping position performs a rectilinear movement in a direction toward the object on which the transverse component directed toward the object is superposed, the gripping fingers have an axis therebetween and the arcuate guiding tracks are arranged symmetrically relative to the axis, and the gripping ends of said gripping fingers have inner sides and are provided at the inner sides with gripping surfaces which face toward the object in the gripping position and each has a portion embracing the object before its diametrical plane and a portion embracing the object after its diametrical plane.

When the gripping arrangement is designed in accordance with the present invention, several advantages are provided. For the movement from the releasing position to the gripping position and vice versa, only a small free space in the neighboring region of the object to be gripped is needed. The gripping arrangement can therefore operate in a very close proximity to the objects with small intermediate spaces. It is of a great advantage first of all when rotation-symmetrical parts, such as parts used with tool adapters for automatic tool exchange devices, must be engaged at both diametrically opposite peripheral regions. In the past it could be done only by mouth-like turning on and turning off of the gripping fingers. In contrast, in the inventive gripping arrangement this engagement is performed in two diametrically opposite peripheral regions so that even with high releasing forces a reliable engagement is provided by the movement of the gripping fingers along the arcuate guiding paths. In the gripping movement performed by the gripping fingers and having one component extending parallel to the axis of symmetry and the other component extending normal to the same, the latter component actuates the radial inward travel in direction to the object to be gripped. It is also advantageous that during movement along the guiding paths of the latter, simultaneously respective reaction forces can be taken in the gripping position, which are produced by the gripping fingers in the event of heavy objects and/or high centrifugal forces acting thereon, and they are applied in the opening direction. The greater are the working centrifugal forces, the greater is the force acting from inside by the engaged object outwardly upon the gripping ends in the opening direction. The thus obtained loading is taken by the respective guiding path which counter-acts an automatic back deflection of each gripping finger in the releasing position with increased resistance. The greater are the weight and similar forces acting in the opening direction upon the gripping ends, the greater are the reaction forces of the gripping arrangement preventing the self-opening. The gripping fingers do not require expensive displacement drive which provides in the gripping position the reliably increased forces. Moreover, the displacement drive can be made simply by a translatorily reciprocable slider. A further essential advantage of the inventive arrangement is that in general and the above-mentioned grounds the gripping arrangement can be made small and light, with a simple construction and operation and with low cost. The compact-like construction is especially advantageous when the gripping arrangement must be moved in the space from one position to the other together with the gripped object. In this case the accelerating and decelerating masses are very small. Such movements require low force and time. The inventive arrangement can be used for many applications and in general in all cases when objects are to be gripped and when it is required to move them. An advantageous field of application is the use of the inventive gripping arrangement in connection with tool exchange devices, for example in such devices which are used with numerically controlled working units, for example horizontal units. In this case a tool inserted in a spindle head with the aid of an adapter must be exchanged fast and collision-free by another tool from a tool magazine associated with the working unit. In this field of application the adapter now has a single ring-shaped collar with a circular V-shaped annular groove which is engaged for gripping and exchange. With the adapters of this type it is necessary now to provide for loss-free engagement of the object considerable closing forces to guarantee that even heavy tools which can be of 20 kg and more are engaged reliably and held during their exchange in condition of very high centrifugal forces. These requirements are satisfied especially well in the inventive gripping arrangement. Also other advantages which will be described hereinbelow are provided in the inventive arrangement.

It is to be understood that the arcuate guiding paths can be arranged in one case both on the gripping fingers and on or in the housing, or in another case they can be arranged on or in the housing. The respective guiding members, such as webs, pins, rollers, projections and the like are then provided on the associated gripper fingers and run along the housing-fixed guiding paths. Instead of this construction, the conditions can be kinematically reversed so that the guiding path is arranged on the gripper finger and the guiding member supported in the guiding path is provided on or in the housing. In this case the guiding members are arranged stationarily and the guiding path with the moveable gripper finger moves relative to the guiding members. A symmetrical gripping process is provided because of the symmetrical arrangement. Depending upon the shape and size of the object to be gripped, also an assymetrical design can be provided.

In accordance with an advantageous embodiment of the invention, the arcuate guiding tracks of the inventive gripping arrangement can extend over an arcuate portion of a parabola, an ellipse, a circle and the like and have a center point located outside of the housing in a region neighboring to the housing. It is to be understood that also other arcuate shapes of similar geometrical shapes can be provided within the frame of the present invention, when it is guaranteed that during extension and retraction of each gripping finger the movement of the same has a linear component and a superimposed transverse component.

In accordance with further embodiments of the invention, each guiding track can be formed by a circular arcuate portion which is separated from the axis by the secant placed on the axis of symmetry. The guiding tracks associated with respect to gripping fingers can be formed as guiding grooves so that each of the gripping fingers is displaceably guided along respective one of the guiding grooves or in the guiding grooves. Each of the guiding grooves can have an arcuate shape, and each of the gripping fingers can have an arcuate shape corresponding to the arcuate shape of the guiding groove and formed as a segment of a parabola, an ellipse, a circle. Drive means for driving the gripping fingers can be formed as a joint drive including a slider reciprocatably moveable in the housing. The housing can be provided with a straight guide extending parallel to the axis of symmetry, and the slider can be displaceable along the straight guide.

The above-described construction of the drive is especially simple and inexpensive. It is easy for the providing of a control.

Still a further feature of the present invention is that there are means for coupling each of the gripping fingers with the slider and this means includes a coulisse guide. The coulisse guide can include a groove provided on the slider or on the gripping fingers and extending transverse to the axis of symmetry and a projection provided on the gripping fingers or on the slide so as to engage and displace in the groove, wherein the projection can be formed as a pin, a roller or the like. The groove in association with the projection does not require taking any forces in the gripping arrangement, which support the gripping fingers against its self-opening in the gripping position, caused by weight and centrifugal forces. These forces which are directed in the opening direction of the mouth lead in the region of the guiding grooves of each gripping finger to increased tilting moments which increase the adhesive friction between the gripping fingers and the gripping paths as function of the above-mentioned forces and thereby block the gripping fingers against self-movement back to the releasing position in dependence on the loosening force.

In accordance with another feature of the present invention, the gripping surfaces of the gripping fingers have a shape, as considered in the plane of displacement of the gripping fingers, of a circular arc with a center point of a circle formed by both gripping surfaces in the gripping position and located inside the mouth region so that an object is reliably engaged in the gripping position at opposite peripheral regions, or in the event of rotation-symemtrical object at diametrically opposite regions.

It is particularly advantageous for an object which is formed as a rotation symmetrical part provided with an annular groove of a V-shaped cross-section, when in accordance with another feature of the present invention each of the gripping surfaces have two lateral flanks extending in a wedge-like manner in direction toward the axis of the symmetry and having a shape corresponding to the shape of the annular groove.

The gripping surfaces in a plane of displacement of the gripping fingers can have at least somewhat V-like prismatic shape or rectilinear shape. The prismatic shape of each gripping surface makes possible engaging the objects with diameters varying in a predetermined region with the same gripping pair. A rectilinear gripping surface makes possible gripping respectively rectilinear or flat parts, for example cubes, blocks and the like.

A substantial self-adjustment in correspondence with the object to be gripped is made possible when in accordance with the invention each of the gripping fingers is provided at its gripping end with a gripping jaw which is held hingedly moveable and carries a respective one of the gripping surfaces.

Each of the gripping jaws can be arranged inside a respective one of the gripping fingers at its gripping end. This has the advantage that the hingedly moveable gripping jaws do not project or project only insignificantly outwardly beyond the gripping edges.

A gripping arrangement particularly for an automatic tool exchange device of working centers can comprise a vertical carriage, a gripping holder reciprocatably displaceable parallel to a spindle axis of the device and held on the vertical carriage, and a double gripper held on the gripper holder turnable by 180° about the turning axis extending at an angle of 45° to the spindle axis, wherein the double gripper can be provided at each its end in a hinge symmetrical arrangement around the turning axis with one housing provided with two fingers whose plane of displacement extends substantially normal to the spindle axis and to a further axis which is normal to the spindle axis. The double gripper can be arranged in a housing and provided inside the housing with an adjusting member which is reciprocable in the direction of the turning axis and extends normally to the latter, and a slider actuating each pair of the gripping fingers can be connected with the adjusting member via a coulisse guide.

Each of the sliders can have a driver, and the adjusting member can have at its each end an open fork in which the driver of a respective on of the sliders is displaceably engaged. The driver can be formed as a pin, a roller or as a coulisse block turnably held on a respective one of the sliders. The adjusting member can enclose with each of the sliders an angle equal to substantially 135°. Finally, a return spring can be arranged to act upon the adjusting member so as to urge the latter to its retracted position in which each slider is held in its extended position in which a respective pair of the gripping fingers is located in its extended gripping position. A hydraulic working cylinder-and-piston is provided having a piston which engages the adjusting member and acts upon it in a direction opposite to the direction of the return spring so as to displace the adjusting member in direction toward the turning axis with respective pulling back of each of the sliders to their retracted position in which a respective one of the pairs of the gripping fingers is located in its releasing position.

In the above-described device the advantages of the inventive gripping arrangement are especially important. In the withdrawn releasing position, the gripping fingers do not project into the collision region which is formed on the one hand by the rotating spindle in the vertical carriage and on the other hand by the moveable tool magazine. The path from the releasing position to the gripping position and vice versa is very small. Therefore the time required to cover this path is very short and shortens the exchange time.

The gripping arrangement requires moreover only small driving power which provides especially simple, space economical and inexpensive construction for the adjusting member. With the angular position between the slider on the one hand and the adjusting member on the other hand, the slider is supported for example in the gripping position automatically against the adjusting member, so that the slider and the gripping fingers can provide in the gripping position a reliable supporting abutment, when the gripping fingers can not be secured in the region of the guiding paths by their own locking in the gripping position. What is also advantageous here is a compact, light and small design of the gripping arrangement, so that with very fast 180° turning movements which are performed by the double gripper during the exchange together with the object held therein, only small accelerating and decelerating masses take place in the gripping arrangement. This also makes possible a decrease in the exchange time. It becomes also advantageous that the gripping arrangement can be used in the cases when a very small free space remains around the object to be gripped, for the movement of the gripping fingers from the releasing position to the gripping position.

The guiding paths, the guiding grooves and the cooperating guiding means moveable during the movement of the gripping fingers relative to the same can be formed with different constructions which are basic for the known art. It is to be understood that an adaptation of the arrangement to the objects of different sizes and shapes, at least within certain limits, can be attained by providing the guiding paths, especially guiding grooves in special carriers which are adjustable in the housing.

The guiding grooves can be held, for example, in correspondingly shaped guiding strips which are supported hingedly moveable in the housing at the ends which are opposite to the gripping ends and fixed in the respective turning position relative to the housing, for example by screws, indexing pins and the like. It is clear that by turning these guiding strips the arcuate path provided thereby can be changed for example relative to the axis of symmetry of the housing and thereby the movement direction of the gripping fingers can also be changed.

The novel features of the present invention which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
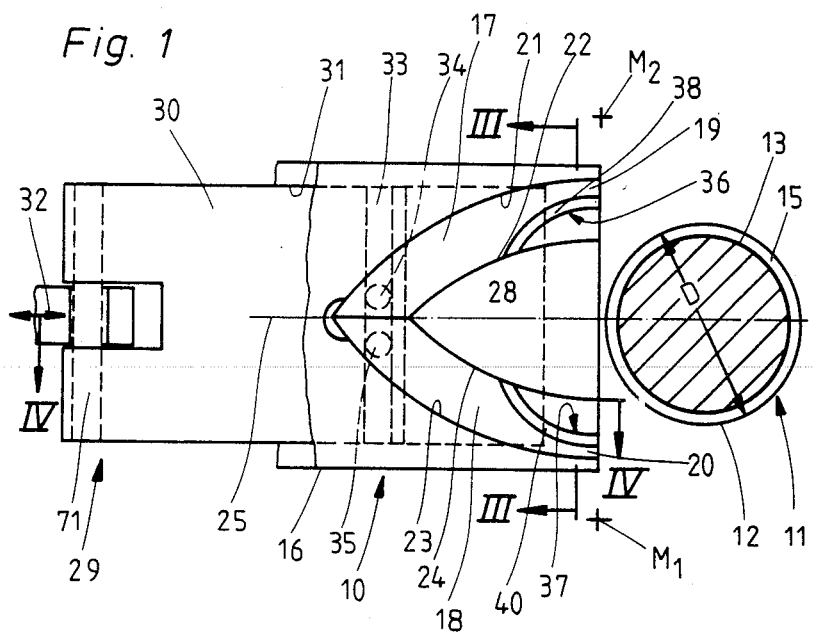
FIG. 1 is a side view schematically showing a gripping arrangement in accordance with the present invention in section with an object gripped thereby, wherein the gripping arrangement is located in its inserted releasing position and formed in accordance with a first embodiment.

A gripping arrangement 10 in accordance with a first embodiment of the invention is shown in FIGS. 1-5 and can be used in general when objects 11 to be gripped are of any shape and dimension to be gripped and/or transported. The gripping arrangement 10 is suitable also for manipulators of practically any type, particularly for industrial robots, and is especially advantageous also for automatic tool exchanging devices shown in FIG. 9. For the sake of simplicity the object 11 in the first embodiment has a rotation-symmetrical part 12, especially a circular ring, with the diameter D. The circular ring 12 has an annular groove 13 which has a substantially V-shaped cross-section with two wedge-like lateral flanks 14 and 15 facing toward one another. In this manner, for example, conventional tool adapters are formed, which hold the respective tools and are used in cooperation with an automatic tool exchange device shown in FIG. 9.

The gripping arrangement 10 has a housing 16 with two gripping fingers 17 and 18. In the gripping position shown in FIG. 2 the gripping fingers 17 and 18 receive and reliably hold the object 11 to be gripped, and particularly its circular ring 12 between their mouth-like clutching gripping ends 19 and 20.

Figure 2:
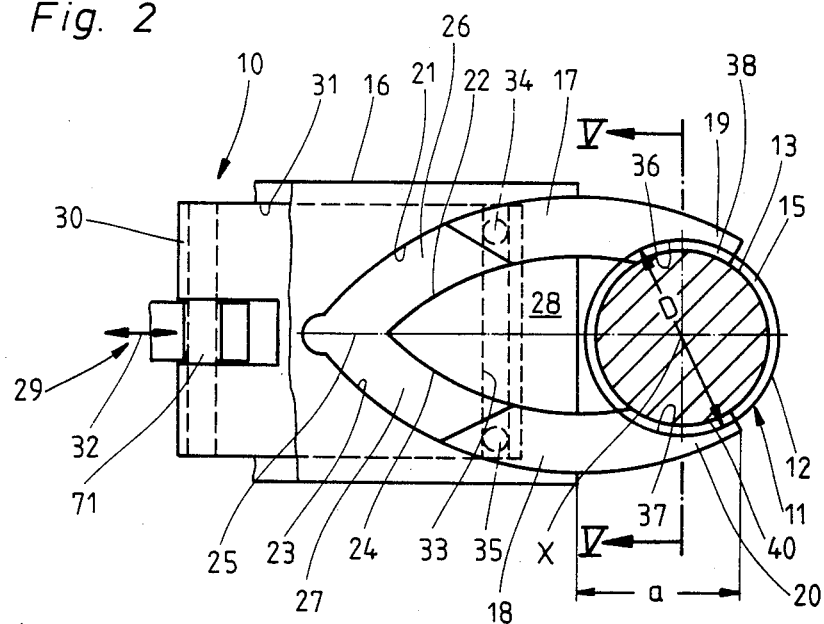
FIG. 2 is a side view substantially corresponding to the view of FIG. 1, but showing the inventive gripping arrangement in an extended gripping position.

The gripping fingers 17 and 18 are held and guided in the housing 16 so that in the gripping position shown in FIG. 2 they extend with their gripping ends 19 and 20 outwardly beyond the housing 16 and particularly over the projecting distance a identified with FIG. 2. In contrast, in their inoperative releasing position shown in FIG. 1 in which they release the object 11, they are received at least substantially completely and without projecting, in the housing 16. In this relieving position the region between the right free end of the housing 16 in FIG. 1 and the object 11 is completely free. It cannot collide with the gripping arrangement 10. In the relieving position shown in FIG. 1 it is completely collision-free. Neither can they be pushed or get caught, nor can the elements operating in the neighboring region collide with somewhat projecting gripping ends.

Both gripping fingers 17 and 18 are translatorally reciprocable along associated guiding tracks 21, 22 or 23, 24 in the housing 16. Both guiding tracks 21, 22 or 23, 24 are arcuate. They extend along an arcuate portion of a parabola, an ellipse or a circle. In the shown example these guiding tracks 21–24 are formed as portions of a circular arc with associated center points M1 or M2 in FIG. 1 which lie here, for example, outside the region of the housing 16 in a neighboring area.

Each gripping finger 17 and 18 is guided along the associated arcuate guiding track 21, 22 or 23, 24 so that the gripping fingers 17 or 18 during the displacement from the inserted releasing position in FIG. 1 in a direction toward the object 11, 12 to be gripped and to the extended gripping position shown in FIG. 2 perform a rectilinear movement in a direction toward the object 11, 12, which is continuously superposed with a transverse component directed toward the object 11, 12.

Both gripping fingers 17 and 18 and their associated arcuate guiding tracks 21, 22 and 23, 24 are arranged hinged-symmetrical relative to one another. Their axis of symmetry 25 can be formed by a central line of the housing 16. The circular arc portion of each guiding track 21, 22 or 23, 24 is at least determined substantially by a part of an arcuate portion which is separated by a secant based on the axis of symmetry 25. The guiding tracks 21, 22 or 23, 24 are formed by flanks of a guiding groove 26 or 27 in which each gripping finger 17 and 18 is displaceably received. The wide surfaces of the gripping fingers 17 and 18 extending parallel to the plane of the drawing in FIGS. 1 and 2 can abut against the respective surfaces of the housing 16. Both guiding grooves 26 and 27 are separated at the right end of the housing 16 by a wedge 28 which is located at the side of the housing and carries the guiding tracks 22 and 24.

In correspondence with the arcuate shape of each guiding groove 26 and 27, each associated gripping finger 17 and 18 is formed as a segment of a parabola, ellipse or circle.

The gripping arrangement 10 has a displacement drive 29 which is used for both gripping fingers 17 and 18. The displacement drive 29 advantageously has a slider 30 which is reciprocatingly guided in the housing 16. The slider 30 is displaceable along a straight guide 31 in the housing 16. It is located at the right side of both gripping fingers 17 and 18 shown in FIGS. 3 and 5.

The movement direction of the slider 30 is identified with the arrow 32 in FIGS. 1 and 2. It extends in a direction parallel to the axis of symmetry 25. Both gripping fingers 17 and 18 are coupled with the slider 30 via a respective coulisse guide, so that a translation movement of the slider 30 in direction of the arrow 32 results in the respective displacement of each gripping finger 17 and 18 in their arcuate guiding groove 26 or 27.

The slider 30 has a groove 33 which forms a part of the coulisse guide and extends transverse to the axis of symmetry 25, whereas each gripping finger 17 and 18 has a projection 34 and 35 engaging in the groove 33 and displaceably guided in a direction of the groove 33. The projections 34 and 35 are formed as a pin, a roller and the like. It is to be understood that these elements can be kinematically reversed.

The gripping ends 19 and 20 of the gripping fingers 17 and 18 have at their inner side which in the engaging position of FIG. 2 faces toward the engaged object 11, 12, a gripping surface 36 and 37 with a shape and dimension corresponding to those of the object 11, 12. The gripping surface has the shape of a portion of a circular arc, as considered in a displacement plane of the gripping fingers 17 and 18 coinciding with the drawing plane of FIGS. 1 and 2. It is essential further that the center point X of both circular arc portions in the gripping position of FIG. 2 of the circle with the diameter D is located inside the mouth region of both gripping ends 19 and 20. In FIG. 2 the center point X is located substantially on the half of the clamping region of both circular arc portions of the gripping ends 19 and 20. As a result of this, the object 11, 12 surrounded by the gripping surfaces 36 and 37 is gripped on two diametrically opposite peripheral regions and so that it cannot fall out.

As can be seen from FIG. 2, each circular arc portion of the gripping surfaces 36 and 37 extends over the apex of the circular ring 12 outwardly to the right so that the object 11 cannot be released by movement to the right from the form-locking clamping. The same thing is provided at the left side in FIG. 2. The object 11 is thereby gripped in a direction of the double arrows 32 form-lockingly and firm by the gripping ends 19 and 20, and particularly so firm that for objects 11 with high weight for example 20 kg and more also in the event of high centrifugal forces acting on the unit, losing of the object 11 from the clamped gripping position is impossible.

Figure 3:
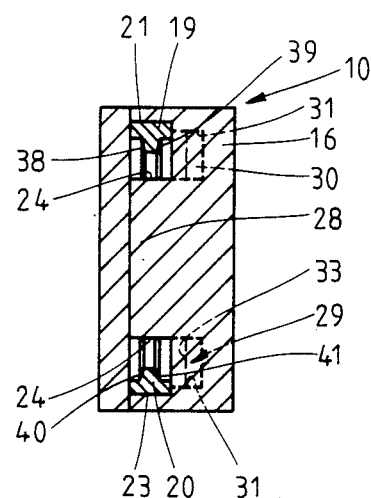
FIGS. 3 and 4 are views showing schematically sections taken along the lines III—III or IV—IV in FIG. 1.
Figure 5:
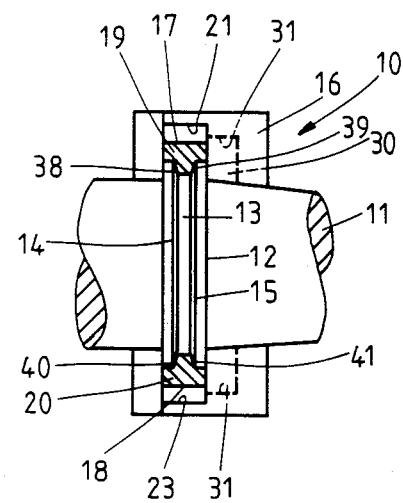
FIG. 5 is a view schematically showing a section taken along the line V—V in FIG. 2.

The cross-section of the gripping surfaces 36 and 37 is shown in FIGS. 3 and 5. Each gripping surface 36 and 37 has two lateral flanks 38, 39 or 40, 41 which are wedge-shaped in the cross-section in direction toward the axis of symmetry 25. The lateral flanks 38, 39 are formed V-shaped relative to one another, as the other lateral flanks 40, 41, and all of them correspond in their cross-section to the substantially V-shaped annular groove 13. Thereby a form-locking engagement in the annular groove 13 and a form-locking holding in a direction of the axis of the object 11, normal to the plane of the drawing of FIGS. 1 and 2, are guaranteed.

Thus, the object is engaged form-lockingly and loss-free in its gripping position in accordance with FIG. 2, in all directions.

The operation of the gripping arrangement 10 is as follows. In the releasing position shown in FIG. 1 the right free ends of the completely withdrawn gripping fingers 17 and 18 are flush with the respective edge of the housing 16. In any event they are withdrawn in a collision-free manner. The slider 30 is displaced in the direction of the arrow 32 to the left in an extreme position. The gripping finger 17 is displaced in counterclockwise direction as far as possible in its guiding groove 26. While FIG. 1 shows that in this releasing position both gripping fingers 17 and 18 abut with their ends against one another, this is not totally necessary. Thereby, the releasing position can be fixed by a form-locking abutment. Instead of this, the fixation can be provided also by abutment for the slider 30.

When the gripping arrangement 10 is brought in the gripping position, the slider 30 is displaced to the right in the direction of the arrow 32 with the aid of the displacement drive 29. Through the projections 34 and 35 engaging in the groove 33, a force acts on the gripping fingers 17 and 18 and displaces the gripping fingers 17 and 18 in the respective guiding grooves 26 and 27 along the arcuate path. Each gripping finger 17 and 18 performs a positive movement in which the gripping fingers 17, 18 in FIG. 2 move to the right out of the housing 16 and in a direction to the object 11, 12 to be gripped. Because of the arcuate path which is provided by the guiding tracks 21-24, the forward movement of the gripping fingers 17 and 18 is simultaneously superposed on a radial movement in a direction toward the center point X of the object 11, 12. In the end position shown in FIG. 2 which for example can be defined by the abutment of the slider 30 against an inner surface of the wedge 28, the gripping ends 19 and 20 engage with their gripping surfaces 36 and 37 in the above-described manner form-lockingly in the annular groove 13 of the circular ring 20 of the object. Thereby the object is engaged in both directions of the arrow 32 as well as in both directions of the longitudinal center axis of the object 11 in form-locking and loss-free manner.

The gripping arrangement 10 is extraordinarily simple and thereby cost-favorable. It is reliable in operation and guarantees a loss-free form-locking engagement of the object 11 in the gripping position. Also in the event of very weak objects 11 and high centrifugal forces which act in the case of fast transportation by a movement of the gripping arrangement 10 to its gripping position, the object 11 is engaged reliably without the danger of possible sliding out and striking in the vicinity. When the object 11 must be released, the slider 30 is displaced to the left with the aid of the displacement drive 29 in a direction of the arrow 32, whereby the gripping fingers 17 and 18 are pulled opposite to the above described step in the housing 16. The gripping surfaces 36 and 37 are lifted in the radial direction outwardly from the circular ring 12 with the interposed movement components substantially parallel to the axis of symmetry 25. Thereby it is prevented that the gripping ends 19 and 20 remain on the previously engaged object 11. Moreover, they release the object in damage-free manner. When the gripping fingers 17 and 18 are completely withdrawn into the housing 16 as shown in FIG. 1, the gripping arrangement 10 assumes its releasing position. The process of releasing is finished. A free space is formed between the previously engaged object 11 and the gripping arrangement 10. The gripping arrangement does not interfere with the object. It is completely collision-free, so that the gripping arrangement 10 and/or the object 11 in the releasing position can move relative to one another without the danger of striking or colliding.

It is to be understood that in another not shown embodiment the gripping fingers 17 and 18 do not run inside the associated guiding tracks 21–24, but instead the gripping fingers 17 and 18 are provided with respective guiding members, for example projections, pins, rollers and the like which run in turn in the respective arcuate guiding grooves, such as the guiding grooves 26 and 27, and are guided. Also other kinematically equivalent variants are within the spirit of the invention.

Figure 6:
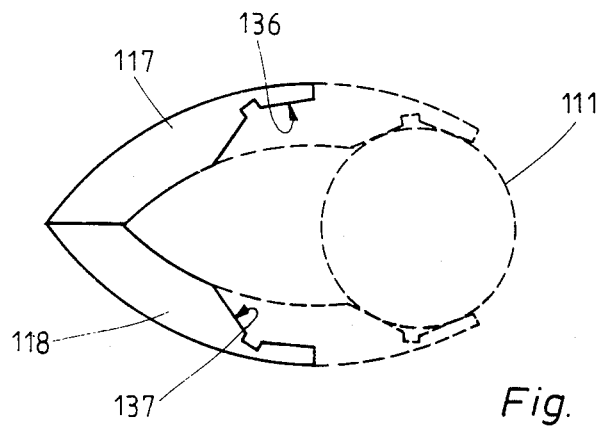
FIGS. 6 and 7 are side views schematically showing one of two gripping fingers of a gripping arrangement in accordance with a second and a third embodiment, respectively.

In the embodiment of FIG. 6 the parts which correspond to the parts of the first embodiment are identified with reference numerals which are higher by 100. Thereby without repetition, the second embodiment can be clearly understood.

The second embodiment in FIG. 6 differs from the first embodiment in that the gripping surfaces 136 and 137 are formed at least slightly V-shaped or in other words prismatic, as seen in the displacement plane of the gripping fingers 117 or 118. The gripping position is shown in FIG. 6 in broken lines. Because of this formation of the gripping surfaces 136 and 137, the gripping fingers 117 and 118 provide for receiving the objects 111 of differently great diameter D which can be varied within a wide region. Because of the prismatic shape, a respective automatic adaptation is performed during engagement of such an object 111.

Figure 7:
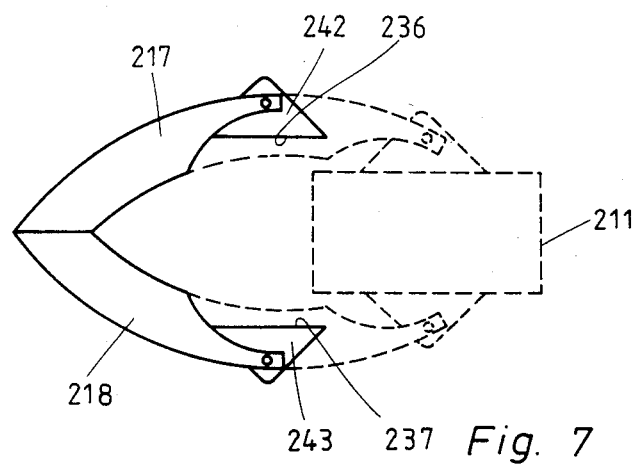

In a third embodiment shown in FIG. 7, the respective parts are identified with reference numerals which are increased by 200 relative to the first embodiment.

In this embodiment the gripping fingers 217 and 218 have respectively a rectilinear gripping surface 236 or 237. The gripping surfaces can be formed at the gripping ends of the gripping fingers 217 and 218, similarly to the first and second embodiment, directly and of one piece with the same. On the other hand, they can be formed as shown in FIG. 7 as separate gripping jaws 242 or 243 which are held swingably moveable at the end of the associated gripping fingers 217 or 218. Because of the swingably moveable arrangement of the separate gripping jaws 242 and 243, the pair of the gripping fingers 217 and 218 can adjust automatically, at least within some limits, to various shapes and spacial positions of the objects 211 to be gripped. It is to be understood that the swingably moveable arrangement of the gripping jaws 242 and 243 is not limited by the rectilinear gripping surfaces 236 and 237. It is especially advantageous when the gripping surfaces in such swingably moveable gripping jaws 242 and 243 are formed arcuate or prismatic.

Figure 8:
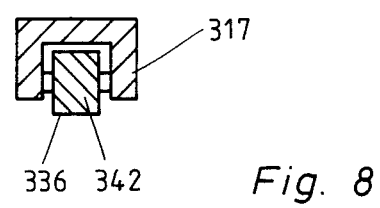
FIG. 8 is a view schematically showing a section of a gripping end of one gripping finger of a gripping finger in accordance with a fourth embodiment of the section.

The fourth embodiment of the invention is shown in FIG. 8. It can be seen that in the case of swingably moveably arranged gripping jaw 342, it can be held inside the gripping finger 317 at the gripping end, so that it practically does not extend or extends at least insignificantly in the mouth direction with the gripping surface 336.

Figure 9:
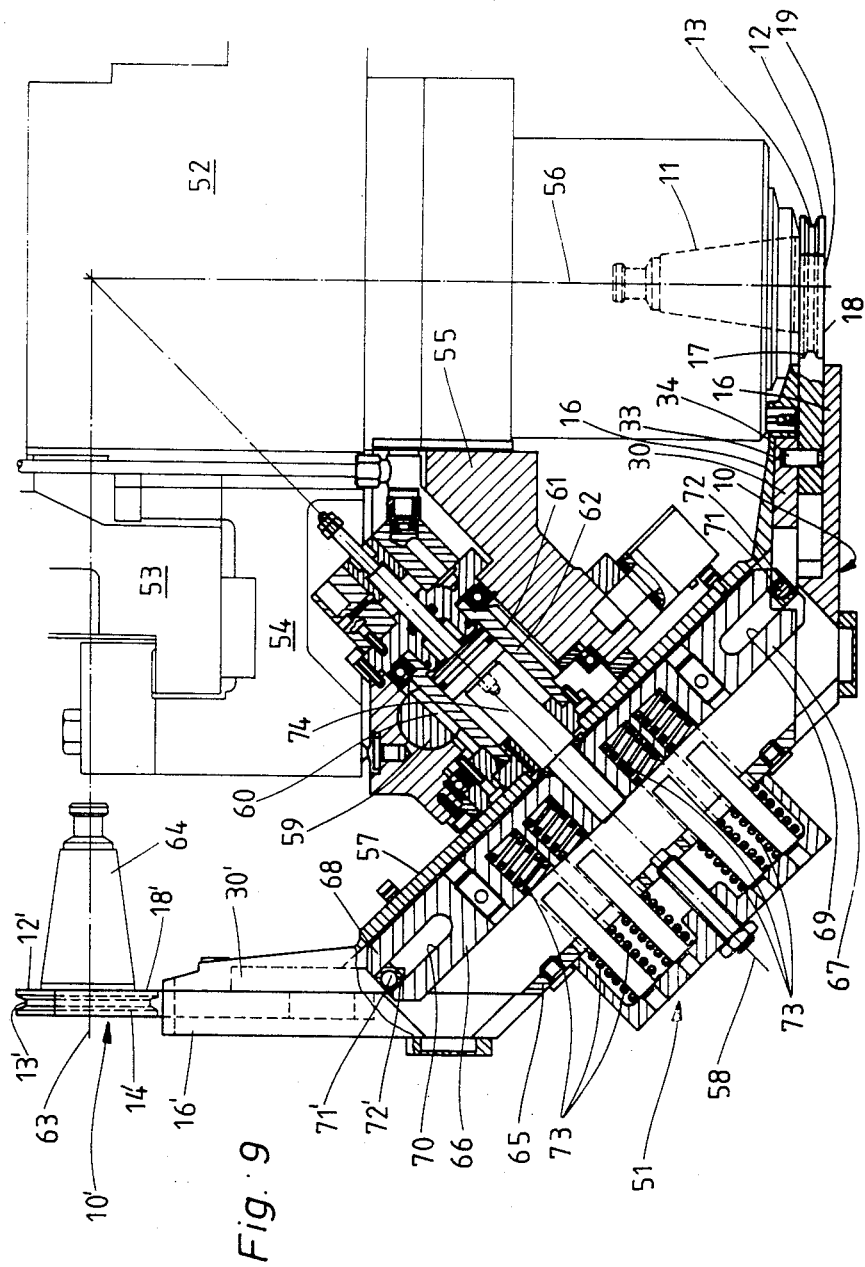
FIG. 9 is a side view schematically showing in a partial horizontal section an automatic tool exchange device with gripping arrangements arranged at both sides in a horizontal working unit, wherein both gripping arrangements are located in extended gripping position.

FIG. 9 shows an automatic tool exchanging device 51 of a horizontal working unit 52. The tool exchanging device 51 carries two completely identical gripping arrangements 10 and 10' such as described for example in the first embodiment in accordance with FIGS. 1–5, in hinge-symmetrical construction.

The working unit 51 has a vertical support 53, and a vertical carriage 54 displaces vertically in Y-direction on the vertical support 53. A gripper holder 55 is displaceable back and forth on the vertical carriage 54 parallel to a spindle axis 56. A double gripper 57 is held turnable back and forth by 180° about a turning axis 58 which extends at an angle to the spindle axis of 45°. The turning movement is performed by a piston 59 of the hydraulic cylinder-and-piston unit. The piston 59 is displaceable upwardly and downwardly normal to the drawing plane. A fixed toothed rod 60 of the cylinder-and-piston unit is arranged in engagement with a toothed wheel 61 on a rotary part 62.

The double gripper 57 has at each end a housing 16 or 16' in a hinge-symmetrical arrangement relative to the turning axis 58, with a pair of the gripping fingers 17, 18 or 17', 18' held thereon. The displacement plane of the gripping fingers is arranged substantially normal to the spindle axis 56 or to a center axis 63 of an adapter 64 which is located in a not-shown tool magazine and holds a tool. The adapter 64 is formed exactly like the object 11 in the region of the spindle axis 56. They both have the circular rings 12 and 12' of identical diameter and provided with annular grooves 13 and 13'.

The double gripper 57 is provided inside its housing 65 with an adjusting member 66 which is moveable back and forth in direction of the turning axis 58 and is adjusted and retained normal to the turning axis 58. The adjusting member 66 is coupled at its one end with the slider 30 or 30' associated with its end, via a coulisse guide, for actuation of the associated pair of the gripper fingers.

Figure 4:
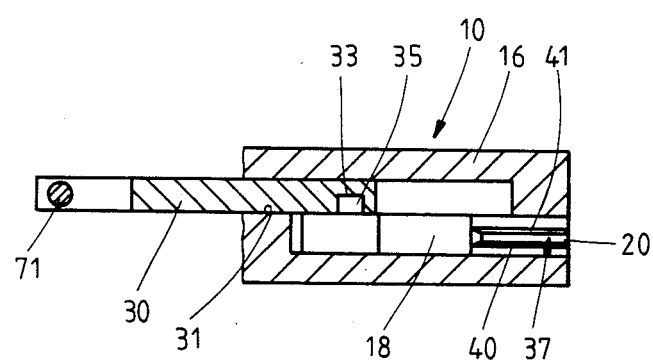

The adjusting member 66 has at its both ends an open fork 67 and 68 with grooves 69 and 70 between both fork legs. A driver 71 or 71' is arranged on the slider 30 or 30' and displaceably received in the groove 69 and 70. The driver 71 and 71' can be composed, as shown in FIGS. 1, 2 and 4, of a pin which transversely extends through a slot provided at one side in the sliders 30 and 30'. The driver can also be formed as a not-shown roller or as a coulisse block 72 or 72' turnably held on the slider 30 and 30'. In the embodiment shown in FIG. 9 it is arranged on the drivers 71 and 71' and corresponds to the grooves 69 and 70 so as to be slidingly displaceable in the latter.

The adjusting member 66 and the sliders 30 and 30' arranged at each end enclose with one another, at the side facing toward the vertical carriage 54, an angle of substantially 135°. The adjusting member 66 is loaded by several return springs 73 in direction toward its retracted position shown in FIG. 9 in which each slider 30 and 30' is retained in its extended position (FIG. 2) in which the associated pair of the gripping fingers 17, 18 and 17', 18' is located in the extended gripping position, as shown in FIG. 2. In this gripping position the gripping arrangement 10 engages in the region of the spindle axis 56 the object 11, whereas the other gripping arrangement 10' engages in a loss-free manner the adapter 64 in the region of the not-shown tool magazine.

A separate hydraulic working cylinder-and-piston unit engages with its piston 74 the adjusting member 66 opposite to the direction of action of the return spring 73, coaxial with the turning axis 58. With turning on the working cylinder-and-piston unit, the piston 74 is extended, and thereby the adjusting member 66 against the action of the return spring 73 displaces coaxially to the turning axis 58 with the return pulling each slider 30 and 30' coupled at their ends to their withdrawn position shown in FIG. 1. In this position the associated pair of gripping fingers 17, 18 or 17', 18' is located in the retracted releasing position as shown in FIG. 1. In the event of failure of the working pressure for the working cylinder-and-piston unit, the adjusting member 66 is moved automatically under the action of the relaxing return springs 73 to the withdrawn position shown in FIG. 9, in which both gripping arrangements 10 and 10' are located in the shown gripping position.

Automatic tool exchange is performed starting from the working position shown in FIG. 9, as follows:

After releasing of respective mechanisms in the not-shown tool magazine and at the side of the spindle, the gripper holder 55 is moved in a direction parallel to the spindle axis 56. The object 11 is withdrawn from the spindle head. Simultaneously the adapter 64 with the tool held therein is pulled in direction parallel to the spindle axis 56 from the not-shown magazine. After this, the turning of the double gripper 57 by 180° is performed by a stroke movement of the piston 59. Then the adapter 64 is located in front of the spindle head, whereas the object 11 is located at the side of the magazine in front of the adapter 64. After this the gripper holder 55 is moved further back toward the spindle axis 56 to the shown position. Thereby the adapter 64 is inserted into the spindle head. At the side of the magazine, the object 11 is inserted into the now vacated magazine space. After this, the working cylinder-and-piston unit for the piston 74 is loaded, and it displaces the piston 74 against the return spring 73. The sliders 30 and 30' are displaced in direction toward the turning axis 58 via the coulisse blocks 72 and 72' located in the grooves 69 and 70, as can be seen from FIG. 1 in the direction of the arrow 32 to the left. The thus controlled pairs of the grippers 17, 18 and 17', 18' are moved in the fully inserted releasing position in which they release the respective circular ring 12 or 12' of the engaged object 11 or adapter 64. In this position the adjusting member 66 can be retained. It is now in a position for a new tool exchange. If the latter takes place, the working cylinder-and-piston unit for the piston 74 is controlled so that it is moved back and the adjusting member 66 moves back thereby and through the relaxed return springs 73 again to the position of FIG. 9 in which the pairs of the gripping fingers of each gripping arrangement 10 or 10' again reach their gripping position.

The use of the gripping arrangements 10 and 10' particularly for such a tool exchange device 51 as shown in FIG. 9 has, in addition the above-described advantages, a special advantage that in the gripping region of the double gripper 57 in the releasing position no collision elements are located. A collision region of the rotatable spindle in the region of the vertical carriage 54 is completely free from any parts extending from the gripping arrangement. The same is true for the region of the magazine. In the releasing position the tool exchange device 51 is thus completely collision-free. The danger of any strike or the like which results in formation of chips on a projecting part and thereby disturbances or damages is completely excluded. It is also advantageous that the gripping arrangement moves only over a small path to move from the releasing position to the gripping position and vice versa. It is favorable also for small exchange time during the tool exchange. Turning of the double gripper 57 around the turning axis 58 by 180° under the action of the piston 59 causes high centrifugal forces especially in the event of heavy tools which can be of 20 kg and even heavier. For retaining the exchange time as small as possible, great acceleration and deceleration forces take place during this turning movement. Also the extreme loads and centrifugal forces which act so as to accelerate the objects engaged at the gripper side are reliably counter acted. The objects which are engaged in the gripping position between the gripping fingers are held reliably firm in condition of such extreme loads.

The special advantage of the inventive arrangement 10 and 10' is clear particularly in connection with the example shown in FIG. 9. As can be seen, no significant radial movement relative to the center point X of the object to be gripped 11 takes place during movement of the gripping fingers 17 and 18 from the releasing position shown in FIG. 1 to the gripping position shown in FIG. 2. The gripping ends 19 and 20 do not move in the radial direction outwardly beyond the side of the housing 16 during the superposed longitudinal and transverse movement caused by the displacement along the arcuate path in the guiding grooves 26 and 27.

With the exception of the tongue-like gripping jaws which turn inwardly about a hinge point connecting both jaws radially in direction toward the object to be gripped and in an opposite direction and therefore require some space in the radial direction, the inventive gripping arrangement 10 and 10' requires in this direction practically no additional free space.

The gripping arrangement 10 and 10' with all above-described advantages can also be used when little free space in the neighboring region in the diametrically opposite gripping regions of the object is available. If one considers the example of the two magazines in FIG. 9, then the adapter 64 located in the exchange position can be engaged in distortion-free manner and the exchange tool can be inserted in front of the object 11 in distortion-free manner during full exchange when only small free space in the radial direction of the circular rings 12 and 12' is available to any neighboring part. This is why the inventive gripping arrangement 10 and 10' provides for a completely collision-free operation.

It will be understood that each of the elements described above, or two or more together, may also find a useful application in other types of constructions differing from the types described above.

While the invention has been illustrated and described as embodied in a gripping arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gripping arrangement, particularly for manipulators, tool exchange devices and the like, comprising a housing; guiding means provided in said housing; two gripping fingers having gripping ends and moveable along said guiding means of said housing in a translatory reciprocating movement between a gripping position in which said gripping ends receive and hold therebetween an object having a diametrical plane and said gripping ends extend outwardly beyond said housing, and a releasing position in which said gripping ends release the object and said gripping fingers are withdrawn substantially completely into and without projecting beyond said housing, said guiding means including arcuate guiding tracks and guiding elements guided in and along the latter so that the movement of said gripping fingers includes a first rectilinear component extending in a direction toward the object to be gripped and a transverse component extending transverse to the first component and in a direction toward the object to be gripped, whereby each of said gripping fingers during its movement from said releasing position toward said gripping position performs a rectilinear movement in a direction toward the object on which said transverse component directed toward the object is superposed, said gripping fingers having an axis therebetween and said arcuate guiding tracks being arranged symmetrically relative to said axis, and said gripping ends of said gripping fingers having inner sides and being provided at said inner sides with gripping surfaces which face toward the object in said gripping position and each has a portion embracing the object before its diametrical plane and a portion embracing the object after its diametrical plane; drive means for driving said gripping fingers in movement and including a joint drive, said drive having a slider reciprocatably moveable in said housing; and means for coupling each of said gripping fingers with said slider and including a coulisse guide.

2. A gripping arrangement as defined in claim 1, wherein said arcuate guiding tracks extend over an arcuate portion of a parabola.

3. An arrangement as defined in claim 1, wherein said arcuate guiding tracks extend over an arcuate portion of an ellipse.

4. A gripping arrangement as defined in claim 1, wherein said arcuate guiding tracks extend along an arcuate portion of a circle.

5. A gripping arrangement as defined in claim 1, wherein said arcuate guiding tracks have an axis of curvature located outside of said housing in a region neighboring to said housing.

6. A gripping arrangement as defined in claim 1, wherein each of said guiding tracks is formed by a circular arcuate portion which is separated from said axis by a secant extending through said axis.

7. An arrangement as defined in claim 1, wherein each of said guiding tracks associated with a respective one of said gripping fingers is formed as a guiding groove so that each of said gripping fingers is displaceably guided along a respective one of said guiding grooves.

8. A gripping arrangement as defined in claim 7, wherein each of said guiding grooves has an arcuate shape, each of said gripping fingers also having an arcuate shape corresponding to the arcuate shape of said guiding grooves.

9. A gripping arrangement as defined in claim 8, wherein each of said gripping fingers is formed as a segment of a parabola.

10. A gripping arrangement as defined in claim 8, wherein each of said gripping fingers is formed as a segment of an ellipse.

11. A gripping arrangement as defined in claim 8, wherein each of said gripping fingers is formed as a segment of a circle.

12. A gripping arrangement as defined in claim 1; and further comprising a straight guide provided in said housing and extending substantially parallel to said axis, said slider being displaceable along said straight guide.

13. A gripping arrangement as defined in claim 1, wherein said slider forms one part to be coupled and each of said gripping fingers forms another part to be coupled, said coulisse guide including a groove provided on one of said parts and extending transverse to said axis and a projection provided on the other of said parts so as to engage and to displace in said groove.

14. A gripping arrangement as defined in claim 13, wherein said groove is provided in said slider, whereas said projection is provided in each of said gripping fingers.

15. A gripping arrangement as defined in claim 13, wherein said projection is formed as a pin.

16. A gripping arrangement as defined in claim 1, wherein said gripping ends of said gripping fingers form together a mouth region, said gripping surfaces having a shape, as considered in the plane of displacement of said gripping fingers, of a circular arc with a center point of a circle formed by both gripping surfaces in said gripping position, said center point being located inside said mouth region so that an object is reliably engaged in said gripping position at opposite peripheral regions.

17. A gripping arrangement as defined in claim 16, especially for gripping of a rotation symmetrical part, wherein said center point is located inside said mouth region so that the rotation symmetrical part is engaged in said gripping position in two diametrically opposite regions.

18. A gripping arrangement as defined in claim 17, particularly for an object which is formed as a rotation symmetrical part provided with an annular groove of a V-shaped cross-section, wherein each of said gripping surfaces having two lateral flanks extending in a wedge-like manner in a direction toward said axis and having a shape corresponding to the shape of the annular groove.

19. A gripping arrangement as defined in claim 1, wherein said gripping surfaces in a plane of displacement of said gripping fingers have at least somewhat V-like prismatic shape.

20. A gripping arrangement as defined in claim 1, wherein said gripping surfaces in a plane of displacement of said gripping fingers have a rectilinear shape.

21. A gripping arrangement as defined in claim 1, wherein each of said gripping fingers is provided at its gripping end with a gripping jaw which is held hingedly moveable and carries a respective one of said gripping surfaces.

22. A gripping arrangement as defined in claim 21, wherein each of said gripping jaws is arranged inside a respective one of said gripping fingers at its gripping end.

23. A gripping arrangement, particularly for manipulators, tool exchange devices for an automatic tool exchange of working centers and the like, comprising a housing; guiding means provided in said housing; two gripping fingers having gripping ends and moveable along said guiding means of said housing in a translatory reciprocating movement between a gripping position in which said gripping ends receive and hold therebetween an object having a diametrical plane and said gripping ends extend outwardly beyond said housing, and a releasing position in which said gripping ends release the object and said gripping fingers are withdrawn substantially completely into and without projecting beyond said housing, said guiding means including arcuate guiding tracks and guiding elements guided in and along the latter so that the movement of said gripping fingers includes a first rectilinear component extending in a direction toward the object to be gripped and a transverse component extending transverse to the first component and in a direction toward the object to be gripped, whereby each of said gripping fingers during its movement from said releasing position toward said gripping position performs a rectilinear movement in a direction toward the object on which said transverse component directed toward the object is superposed, said gripping fingers having an axis therebetween and said arcuate guiding tracks being arranged symmetrically relative to said axis, and said gripping ends of said gripping fingers having inner sides and being provided at said inner sides with gripping surfaces which face toward the object in said gripping position and each has a portion embracing the object before its diametrical plane and a portion embracing the object after its diametrical plane; a vertical carriage; a gripping holder reciprocatably displaceable parallel to a spindle axis of the device and held on said vertical carriage; and a double gripper held on said gripping holder turnable by 180° about a turning axis extending at an angle of 45° to the spindle axis, said double gripper being provided at each its end in a hinge-symmetrical arrangement around the turning axis with one such housing provided with two such gripping fingers whose plane of displacement extends substantially normal to the spindle axis and to a further axis which is normal to the spindle axis; a housing for said double gripper, said double gripper having inside said double gripper housing an adjusting member which is reciprocable in a direction of said turning axis and extends normally to the latter; a slider actuating each pair of said gripping fingers; and a coulisse guide connecting each end of said adjusting member with a respective one of said sliders, each of said sliders having a driver, said adjusting member having at its each end a fork in which said driver of a respective one of said sliders is displacably engaged.

24. A gripping arrangement as defined in claim 23, wherein each of said forks of said adjusting member is formed as an open fork.

25. A gripping arrangement as defined in claim 23, wherein said driver is formed as a pin.

26. A gripping arrangement as defined in claim 23, wherein said driver is formed as a coulisse block turnably held on a respective one of said sliders.

27. A gripping arrangement as defined in claim 23, wherein said adjusting member encloses with each of said sliders an angle equal to substantially 135°.

28. A gripping arrangement as defined in claim 23; and further comprising a return spring arranged to act upon said adjusting member so as to urge the latter to its retracted position in which each slider is held in its extended position in which a respective one of said pairs of said gripping fingers is located in its extended gripping position.

29. A gripping arrangement as defined in claim 28; and further comprising a hydraulic working cylinder-and-piston unit having a piston which engages said adjusting member and acts upon it in a direction opposite to the direction of action of said return spring so as to displace said adjusting member in a direction toward said turning axis with respective pulling back of each of said sliders to their retracted position in which a respective one of said pairs of said gripping fingers is located in its releasing position.

* * * * *